United States Patent [19]

Kaiura et al.

[11] Patent Number: 4,814,004
[45] Date of Patent: Mar. 21, 1989

[54] NON-FERROUS METAL RECOVERY

[75] Inventors: Gary H. Kaiura; James F. Jackson; Richard O. Laine, all of Sudbury, Canada

[73] Assignee: Falconbridge Limited, Toronto, Canada

[21] Appl. No.: 55,595

[22] Filed: May 29, 1987

[51] Int. Cl.[4] .................................................. C22B 7/4
[52] U.S. Cl. ............................................ 75/24; 75/72; 75/82
[58] Field of Search ...................................... 75/24, 82

[56] References Cited

U.S. PATENT DOCUMENTS

| | | |
|---|---|---|
| 1,822,588 | 1/1929 | Fowler et al. . |
| 2,053,016 | 9/1933 | Simcox et al. . |
| 2,295,219 | 9/1942 | Kalling et al. . |
| 2,471,562 | 5/1949 | Fitterer . |
| 2,573,153 | 10/1951 | Lichty . |
| 2,653,867 | 9/1953 | Lindsley et al. . |
| 2,653,868 | 9/1953 | Lichty . |
| 2,698,229 | 12/1954 | Lindsley et al. . |
| 3,506,435 | 4/1970 | Themelis et al. ............ 75/82 |
| 4,036,636 | 7/1977 | Ammann et al. . |
| 4,108,638 | 8/1978 | NaKabe ........................ 75/82 |
| 4,484,730 | 11/1984 | Dimitror ...................... 75/24 |

FOREIGN PATENT DOCUMENTS

| | | |
|---|---|---|
| 562973 | 9/1958 | Canada . |
| 605528 | 9/1960 | Canada . |
| 827059 | 11/1969 | Canada . |
| 998246 | 10/1976 | Canada . |
| 1067001 | 11/1979 | Canada . |
| 1102141 | 6/1981 | Canada . |
| 1104835 | 7/1981 | Canada . |
| 2447403 | 8/1980 | France . |
| 717145 | 2/1980 | U.S.S.R. . |

OTHER PUBLICATIONS

Nakanishi K., et al "Possible relationship between energy dissipation and agitation in steel processing operations", Iron and Steelmaking (Quarterly) 1975, No. 3, 193-197.

Primary Examiner—Melvyn J. Andrews
Attorney, Agent, or Firm—Ridout & Maybee

[57] ABSTRACT

Metal values in non-ferrous metallugical slag are recovered by gently agitating the slag in contact with matte using stirring energy dissipation rates insufficient to emulsify slag in matte. These low agitation rates conserve energy by reducing cooling of the charge, especially by reducing the period required for the slag and matte to separate out into distinct layers after agitation, and the preferred energy dissipation rates increase the efficiency of the value metal recovery and avoid or reduce impairment of the reducing capabilities of the matte and hence its capabilities for reducing and collecting oxidized value metal species from the matte by avoiding or reducing oxidation of the matte as a result of dispersal of the oxidation-protective overlay of slag and contact of the matte with the ambient oxidizing atmosphere.

32 Claims, 4 Drawing Sheets

NON-FERROUS METAL RECOVERY

The present invention relates to non-ferrous metal recovery, and more especially to the recovery of non-ferrous metal values retained in slag in the course of smelting, converting or similar furnacing of sulfides and sulfidic concentrates.

Generally, in the process of extracting non-ferrous metals from their oxidic or sulfidic concentrates by smelting, a liquid slag lays over the molten matte or alloy containing the value metals. The primary role of slag in the smelting and furnacing process is to incorporate the unwanted components of the concentrate, such as gangue and the accompanying iron minerals into the slag which ultimately is usually discarded. It is, however, inevitable that a portion of value metal will also be dissolved by the slag thus providing the slag with an undesirably elevated concentration of value metal or metals. In order to render the metal recovery more efficient, processes known as "slag-cleaning" processes have been devised to reduce the amount of metal lost in the discarded slag.

Applicant is aware of prior proposals wherein the slag is agitated in contact with matte capable of accepting value metals from the slag. Prior proposals of which the applicant is aware have employed intensive and vigorous agitation of the charge of slag and matte in order to mix the slag and matte well together since it has been considered that the extraction of metal values by the matte can be speeded up and made more efficient by increasing the intimacy of the liquid-liquid contact. Generally, such agitation is performed by injection of gases through the charge of slag and matte. It has also been proposed to inject reducing agents into the charge of slag and matte in order to reduce oxidized metal values in the slag to elemental or other reduced form in which they can readily be taken up by dissolving in the matte. The reducing agents have usually been solids or liquids entrained in a gas injected into the charge, or were reducing gases injected directly into the charge. The injection of such reducing agents also brings about intensive and vigorous agitation of the slag and matte owing to the need to employ large volumes of gases to entrain adequate quantities of solid or liquid reducing agents or to effect an adequate reduction in the case in which the stirring gas is itself the reducing agent.

The inventor has found that, unexpectedly, gentle agitation of matte in contact with slag promotes highly effective impoverishment of the slag in metal values and correspondingly highly effective enrichment of the matte with the metal values. Most surprisingly, it has been found that increasingly intensive agitation above a certain level impairs the effectiveness of metal value removal, leading to decreased recoveries of value metal.

As a result of the finding that gentle agitation can achieve satisfactory slag cleaning, it is possible to conduct an advantageously economical slag cleaning process, since the energy costs associated with the slag cleaning can be considerably reduced for reasons which are set out below:

1. In the case in which gas stirring is employed, gentle agitation avoids cooling of the charge of slag and matte by contact with large volumes of relatively cold gas tending to reduce the temperature of the matte and slag.

2. The energy cost associated with generating the stirring energy is reduced, e.g. in the case in which gas stirring is employed, the consumption of compressed gas is reduced.

3. Gentle agitation reduces the erosion of the refractory brick or other refractory material used to line the vessel in which the matte and slag are maintained during the slag cleaning process.

4. Most importantly, gentle agitation avoids formation of a slag-matte emulsion which requires extended settling times before the cleaned slag can be separated. With the present process the rate of throughput of the slag can be increased even where a small vessel is used to contain the matte and slag. Further, the interval between the introduction of the hot slag and its discharge after cleaning can be considerably reduced and hence heat losses due to heat transfer from the matte and slag to the surroundings can be reduced.

As a result, using gentle agitation conditions, it is possible to conduct slag cleaning operations with little requirement for heating the matte and slag. In this manner, an economical cleaning process can be achieved since the process can be conducted almost autogenously and the value of the metal recovered in the matte will greatly exceed the energy costs of agitating and heating the matte and slag.

Accordingly, the present invention provides a process for recovering value metal from non-ferrous metallurgical slag comprising providing a non-ferrous metallurgical slag containing an elevated concentration of a value metal, contacting the slag in molten state with a molten matte having a content of the value metal sufficiently low that the matte can absorb value metal from the slag, gently agitating the matte to intermingle the slag with the matte without forming a slag-matte emulsion, continuing the agitation of the matte for a period sufficient to cause enrichment of the matte with the value metal by transfer from the slag and to thereby impoverish the slag in the value metal, allowing the matte and slag to settle into distinct layers, removing the impoverished slag and recovering a matte relatively enriched in the value metal.

As noted above, in the present process, the agitation is conducted in such manner that formation of a slag-matte emulsion is avoided.

In practice, the formation of a slag-matte emulsion can readily be detected since it will result in the persistence of substantial quantities of inclusions of slag in the matte phase and of matte in the slag phase for a prolonged period after agitation has ceased and the slag and the matte have been left to settle into distinct layers or phases under quiescent conditions. The persistence of such inclusions in the separated phases indicates that excessive agitation has been applied. When the process is conducted in accordance with the invention, the settled-out layers of each phase obtained after a brief period following ceasing of the agitation contain substantially no inclusions of the other phase. For example, in the preferred form of the present invention, settled out distinct phases of matte and of slag containing substantially no inclusions of the other phase are obtained after the mixture has been left to settle under quiescent conditions for about 1 to 5 minutes, more preferably for about 1 to about 3 minutes.

As indicated above in the process of the present invention sufficient agitation is applied to the matte to intermingle the slag with the matte. Without wishing to be bound by any theory, it is suggested that the slag usually contains value metals such as copper, cobalt and nickel in oxidized form, e.g. in the form of dissolved metal oxides, possibly as dissolved metal sulfide, as dissolved metal in elemental form, and as droplets of liquid matte. Usually, the matte will contain elemental iron or will otherwise be at an oxidation potential capable of reducing the oxidized forms of the value metals such as oxides and sulfides to elemental form. Accordingly, it is suggested that a certain minimum amount of liquid matte-liquid slag contact is required to be brought about through agitation in order to intermingle the slag and matte to achieve a reduction of oxidized metal values to a form which will become dissolved in the matte. Further, it is suggested a certain minimum amount of slag-matte contact is required for the matte to wash or dissolve out metal values present in the slag in dissolved form, in a fashion analogous to conventional liquid-liquid extraction, and a certain minimum amount of slag-matte contact is required in order to coalesce and collect liquid droplets of matte present in the slag.

Matte-liquid slag mixing is also usually required in order to achieve heat transfer from the slag to the matte, since normally the matte is cooler than the slag. The higher the temperature of the matte, the greater the reduction potential that can be achieved without excessive quantities of iron-based alloy solidifying out in the matte. Agitation of the matte has the dual function of causing heat transfer from the slag to the matte, thus increasing the temperature of the matte and of mixing the matte so as to avoid temperature gradients and particularly avoiding the bottom of the matte from becoming excessively cool, with attendant risk of excessive quantities of iron-based alloy solidfying out in the bottom regions of the matte. Hence the more the agitation, the greater the reduction potential at which the process can be operted and the more efficient the slag cleaning process.

As noted above, application of excessively vigorous agitation to the matte results in excessive expenditure of energy and cooling of the charge of matte and slag where a cold stirring gas is employed tending to reduce the temperature of the matte and slag, and results in the formation of a slag-matte emulsion, requiring excessively long settling times in order to obtain layers of slag and matte substantially free from inclusions of the other phase, thus leading to increased losses from the charge in the interval between contacting the matte with the hot slag and separating the cleaned slag. Excessively vigorous agitation also leads to rapid erosion of the refractory brick or other refractory materials employed to line the vessel which contains the slag and matte during the recovery process. Moreover, with increasingly more intensive agitation, the recovery of metal values from the slag is impaired. The reasons for this are at present not fully understood, but it is suggested that increasingly intensive agitation impairs the reducing potential of the matte. For example where, as is usual, the matte contains substantial quantities of dissolved elemental iron which will act as a reductant for oxidized metal species in the slag, and the freeboard space above the slag and matte during the recovery process contains substantial quantities of oxygen, increasingly intensive agitation increases the exposure of quantities of the liquid matte to the oxygen-containing atmosphere of the freeboard space above the slag. As a result, there is increased oxidation of the iron contained in the matte. Further, increased agitation disperses the layer of slag which usually overlays the matte and acts as a protective layer against oxidation, and thus increases the oxidation of the matte by contact with the ambient oxidizing or oxygencontaining atmosphere. As a result, the reducing capabilities of the matte, and hence its capabilities for reducing and collecting oxidized value metal species from the slag, are impaired. Applying the agitation to the matte rather than to the slag has the advantage of causing intermingling of the matte with the slag while causing less disruption of the protective slag overlay.

Advantageously, gentle agitation of the matte is achieved by applying to the matte one or more agitation means dissipating from about 5 to about 600 watts per mT. Such agitation means may comprise, for example driven paddles, or the injection of stirring gas through an injection orifice disposed below the level of the upper surface of the matte, or other agitation means which agitate a more or less localised zone of the matte. If the agitation energy expenditure rate applied by such agitation means is less than about 5 watts per mT, the recovery of value metals from the slag in many cases tends to become uneconomically low, since there tends to be an inadequate amount of liquid matte-liquid slag intermingling. Using an agitation energy dissipation rate in excess of about 600 watts per mT may result in excessive expenditure of energy, and such problems as formation of slag-matte emulsions and excessive erosion of the refractory material lining. Further, it tends to produce excessive cooling of the slag and matte in the event that a stirring gas which is non-oxidizing, or otherwise does not react exothermically with the slag and matte, is used. Moreover, it tends to result in reduced recoveries of value metal from the slag.

Preferably, the agitation means dissipate about 20 to about 400 watts per mT, more preferably about 40 to about 160 watts per mT.

When the agitation is conducted by injecting stirring gas into the matte, the rate of agitation energy dissipation can be calculated in terms of watts per mT, using Nakanishi et al's equations described in "Possible relationship between energy dissipation and agitation in steel processing operations", Nakanishi et al. Ironmaking and Steelmaking (Quarterly), 1975, No. 3, pages 193 to 197, especially Nakanishi's equation (5):

$$\dot{\epsilon} = (0.0285 \, QT/W_g) \log (1 + Z/148)$$

wherein $\dot{\epsilon}$ is the rate of energy dissipation in watts per mT (metric tonne) of the agitated portion of the slag and matte, Q is the flow rate of stirring gas in l/min at NTP, T is the absolute temperature °K, $W_g$ is the weight of the bath in mT, and Z is the height of the melt, i.e. the height of the top surface of the slag, above the point of entry of the stirring gas, in cm. Hence, from knowledge of or calculation of the weight of slag and matte that is agitated by the stirring gas, the stirring energy dissipation rate in watts can be calculated.

When the agitation means comprises injection of a stirring gas, it is usually more convenient to refer to the rate of dissipation of stirring energy in terms of the volume flow rate of stirring gas introduced through the gas injection orifice. Thus, adequate intermingling of the slag and matte can be achieved, providing satisfactory recoveries of value metal, without causing excessively intensive agitation of the matte, and without encountering the resultant problems such as formation of a slag-matte emulsion, poor recoveries, etc., by injection of stirring gas into the matte through one or more injection orifices, when the flow rate of gas through the or each orifice is in the range of from about 3 to about 250 Nm$^3$/hr (normal cubic meters per hour), more preferably about 8 to about 160 Nm$^3$/hr, still more preferably about 15 to about 65 Nm$^3$/hr.

In some forms of the present process, a discrete quantity of the slag and matte are agitated together. For example, a discrete quantity or batch of slag and matte may be isolated in a containment vessel, the whole contents of which are agitated by applying agitation to the matte layer therein. In a further example, the process may be applied continuously wherein slag and matte are flowed co-currently or countercurrently and a portion of the flow of matte is agitated in contact with a portion of the flow of slag. Such agitation may, for example, take place in an agitated zone of a channel or trough along which a lower layer of matte and an upper layer of slag are flowed in contact with one another. In a still further example, a quantity of slag and matte are isolated in a containment vessel and are agitated together by rocking the containment vessel. In such cases, in order to achieve adequate intermingling without excessive agitation of the slag and matte, the agitation applied should dissipate from about 20 to about 2000 watts per mT of the total weight of the agitated quantity of slag and matte.

Preferably, in all cases, the agitation applied to the matte dissipates per mT of the total weight of the agitated quantity of slag and matte, about 20 to about 2000 watts, more preferably about 20 to about 1600 watts, and still more preferably about 40 to about 650 watts.

In one highly advantageous form, the recovery process is operated in association with a value metal extraction process in which an impure form of the value metal, for example, an ore, concentrate, roasted concentrate, or the like is smelted in a furnace, for example an electric arc furnace, in the presence of flux to obtain a furnace matte, usually consisting of a sulfidic alloy of iron and a non-ferrous value metal, and a slag, which will contain a substantial proportion of the unwanted materials present in the impure form of the metal. This slag is normally discarded. A portion of the furnace matte is subjected to converting in the presence of a flux, and in the presence of oxygen, usually by having air or oxygen blown through it, to obtain a high grade converter matte containing elevated concentrations of the value metal. The converter matte thus obtained is recovered and subjected to further extraction processing. Also obtained in the converting process is a converter slag which will contain quantities of the value metal, at least partly as a result of it having been intimately mixed with the high grade converter matte during the converting process. For example, in a typical nickel extraction process, wherein it is desired to produce a converter matte containing high grades of nickel as well as of other value metals which are associated with the nickel, for example copper, and more importantly, cobalt, the converter slag will usually contain substantial quantities of nickel, copper and cobalt. In the preferred form of the present process, the remaining portion of the furnace matte (i.e. the portion not transferred direct to the converters) is employed as the matte in the above-described recovery process, and the converter slag is subjected to the above-described recovery process. Since the furnace matte is readily available in substantial quantities in the normal operation of the smelter, and contains relatively low grades of the value metals, it forms a convenient source of matte which is readily capable of accepting transfer of metal value from the converter slag. With this form of the process, the impoverished slag obtained from the recovery process can be recycled to the furnace, while the enriched matte obtained is forwarded to the converters.

Employing typical non-ferrous metallurgical slags and mattes, it is normally desirable to maintain the charge of matte and slag during the present recovery process at a temperature of about 1150° to about 1250° C. If the charge is maintained at temperatures much lower than about 1150° C., there is a tendency for the slag to start to solidify, precluding cleaning of the slag. The commencement of solidification can give rise to problems of foaming of the charge, since slag solids are foam stabilizers. A certain amount of gas is usually generated within the charge as a result of the chemical reactions taking place during the recovery process, and there is, therefore, the problem that at lower temperatures the charge of slag may foam uncontrollably, out of a treatment vessel, for example. Foaming is, of course, also a problem where agitation is conducted by injecting stirring gas, but can be reduced or avoided by maintaining the charge of slag above the temperature at which the slag starts to solidify. The use of temperatures in excess of about 1250° C. do not appear to increase the efficiency of the recovery process, and result in increased energy costs of maintaining the charge at elevated temperature. Further, the higher temperatures tend to result in undesirably increased chemical wear of the brick or other refractory material lining of the vessel in which the recovery process is conducted. More preferably, the charge of slag and matte is maintained at a temperature of about 1180° to about 1235° C.

The above-described preferred form of the process, wherein furnace matte and converter slag are employed, provides the further advantage that on mixing together appropriate proportions of the slag and matte, at the temperatures at which they are typically obtained from the converter and from the furnace, respectively, a mixture is obtained having its temperature in the above-described ranges. As described in more detail below, in the preferred form, a plurality of volumes of the slag will be contacted with each volume of the matte employed in the recovery process. In a typical smelter operation, the furnace matte will be at a temperature of about 1100° to about 1200° C., more usually about 1120° to about 1150° C., while the slag from the converters will be at a temperature of about 1200° to about 1300° C. Thus, on mixing together these slags and mattes in the appropriate proportions a charge can be obtained which has its temperature at approximately the above-described preferred range of about 1150° to about 1250° C., more preferably about 1180° to about 1235° C. As will be appreciated, this considerably reduces the need for heating of the charge, thus considerably reducing the energy costs associated with the recovery process. Typically, the heat requirement in the present process will be no more than about 1 to 3×10$^8$ joules per mT of the slag processed, more typically about 2×10$^8$ joules per mT. The low heat requirement for the process allows the use of heating means for heating the charge which have relatively low heat transfer rates, and which are relatively economical in their consumption of energy. For example, in the preferred form, the charge ishheated using a gas flame burner firing into a freeboard space above the charge of slag and matte. If desired, of course, other heating devices may be employed, for example a plasma arc operating in the freeboard space or electrodes immersed in the bath. However, the gas flame burner is less expensive in terms of equipment costs.

In the preferred form, the charge of slag and matte is agitated together for a period of about 5 to about 20 minutes. If agitation periods of much less than about 5 minutes are employed, the concentrations of metal values remaining in the slag tend to become too high, rendering the process economically unattractive. Agitation periods of longer than about 20 minutes appear to be unnecessary since they do not result in reduced concentrations of metal values in the slag, and result in increased wear of the refractory lining of the containment vessel. They also tend to result in an undesirable degree of cooling of the charge, thus necessitating increased heat inputs in order to maintain the charge at the desired temperature or temperature range, and thus also increasing the costs of the process. Further, prolonged agitation results in increased oxidation of the matte, resulting in impairment of its reducing potential and thus impairing the ability of the matte to reduce oxidized metal values present in the slag and to effect slag cleaning. More preferably, the agitation is conducted for a period of about 5 to about 15 minutes.

In the preferred form, the matte is agitated with a plurality times its own volume of the slag, since it may be so agitated without losing its capability of accepting metal values from the slag. This has the advantage that it reduces the quantity of matte such as furnace matte that needs to be diverted from the converters, and further, as noted above, blending a plurality of volumes of slag with matte can achieve a charge at a temperature approximating to the temperature range desired to be maintained during the recovery process, and thus economizes on the quantity of heat energy needed to be expended in order to maintain the charge in the desired temperature range. Preferably, each volume of matte is agitated with about 2 to about 10 volumes of slag in the recovery process. If the volume ratio of slag to matte is much in excess of about 10, the recovery process becomes less efficient due to a rise in the concentration of metal values in the matte phase. If the volume ratio of slag to matte is much less than about 2, this tends to lead to increasing concentrations of sulfur in the slag, which tend to result in increased solubility of metal values in the slag, thus reducing the efficiency of the slag cleaning process. In the more preferred form, the volume ratio of slag to matte is about 3:1 to about 5:1.

In the preferred form, the process is conducted in the presence of a reductant capable of reducing metal values present in the slag in oxide or other compound form to reduced or elemental forms which then dissolve in the molten matte and are effectively removed from the slag. Usually, the slag will contain substantial quantities of the non-value metal iron in the form of magnetite ($Fe_3O_4$) which has to be reduced to wustite (FeO) and preferably at least partially to iron (Fe) before the metal value oxides such as nickel oxide, copper oxide and cobalt oxide are reduced to their elemental forms. Accordingly, the amount of reductant employed should preferably be at least the stoichiometric amount required to reduce $Fe_3O_4$ to FeO, to reduce at least part of the FeO to Fe and to reduce nickel, copper and cobalt oxides to elemental metal. Desirably, since it is normally impossible to exclude oxygen from the zone in which the matte is agitated together with the slag, a slight excess over the stoichiometric amount will be employed, e.g. in an amount of about 25 to 30% greater than the stoichiometric amount. In the preferred form, a solid reductant is employed and gaseous and liquid reductants are not employed. Usually, the gaseous reductants need to be added in relatively large volumes, giving rise to problems of foaming of the charge and of generation of a slag/matte emulsion which leads to prolonged settling times and leads to the problems of excessive cooling of the charge discussed above. The gaseous and liquid reductants are usually hydrocarbons or are otherwise highly carbonaceous, and tend to react to generate large uantities of carbon monoxide, carbon dioxide or other gases which tend to give rise to a further foaming problem. Preferably, a solid reductant is employed, therefore. Examples of solid reductants include iron, iron based alloys for example steels and cast iron, silicon carbide, aluminum, calcium, calcium silicide and ferrosilicon. Usually these materials will be employed in the form of small pieces or particles, so that they are readily melted and distributed through the molten charge to be treated. In the preferred form, the solid reductant has a specific gravity greater than that of the metallurgical slag so that when added to a freeboard space above the charge it will penetrate downwardly through an overlayer of slag that is usually present and will not therefore remain on the upper surface of the slag where it will be consumed by reaction with oxygen in the freeboard space above the slag. In the preferred form, the solid reductant is mixed with the matte before the matte is agitated with the slag. Often, the reaction of the solid reductant with the charge tends to liberate gas. For example, often the solid reductant has a small content of carbon which tends to react with the matte and slag to liberate carbon dioxide and carbon monoxide. This can lead to problems of foaming of the slag at the time of agitation of the slag with the matte, and it is therefore desirable to dissolve the reductant in the matte and to permit any carbon dioxide or other gases produced to be liberated before the commencement of agitation of the matte in contact with the slag.

In one highly advantageous form of the present invention, the solid reductant that is employed is ferrosilicon containing about 9 to about 18% silicon, and the balance predominantly iron, and that preferably has a melting point in the range of about 1150° to about 1250° C. This material is effective to reduce magnetite to wustite and wustite to elemental iron and to reduce oxidized species of such metal values as copper, nickel and cobalt to their elemental forms. Moreover, it has a specific gravity of about 6.5, whereas the more usually encountered ferrosilicon containing 50% weight by silicon has a specific gravity of about 4.7. Thus the 9 to 18% silicon material is well adapted to sink through a layer of slag, normally having a specific gravity of about 4.1, and to mix with the matte before the matte is agitated with the slag.

As discussed above, desirably the quantity of solid reductant used is in an amount slightly in excess of that required to reduce the $Fe_3O_4$ content in the slag to FeO, to Fe, and to reduce oxidized value metal present in the slag to elemental value metal. In the case in which the solid reductant is the 9 to 18% silicon ferrosilicon, desirably the amount of solid reductant employed is about 4 to about 5% by weight based on the weight of slag which is treated.

As will be appreciated, as a result of the blending of the matte with the solid reductant, the matte is brought to a relatively high reduction potential, and as a result, is well adapted to reduce oxidized value metal species present in the slag to elemental form. In the preferred form, the iron content of the matte is maintained above the level which the matte can maintain in solution at the temperature at which the matte is maintained. That is to say, the matte is maintained in an iron-based alloy saturated condition. It has been found that as the iron content of the matte increases, the content of value metal in the slag after treatment decreases.

Although as noted above, it is possible to agitate the charge of slag and matte together by various means, such as by stirring, by the use of driven paddle wheels, by gentle rocking of a vessel in which the slag and matte charge is maintained, etc., in the preferred form, the matte is agitated by injection of gas, into the matte layer. Since it is desired to maintain the matte in a reducing condition capable of reducing oxidized value metal species present in the slag, desirably the use of air or other strongly oxidizing gas as the stirring gas is avoided, and the stirring gas is a mildly oxidizing gas such as carbon dioxide which is mildly oxidizing at the reduction potential preferred for the matte, a neutral gas, for example, nitrogen, or argon, or a reducing gas for example ammonia, hydrogen or natural gas, or a mixture of two or more of any of these. Preferably the stirring gas is nitrogen because of its ready availability, low cost and safety.

Conveniently, the present recovery process is conducted as a batch process wherein a batch of matte is maintained in a reaction vessel and periodically batches of slag are introduced into the vessel, and are agitated and reacted together with the matte and, after treatment, the impoverished slag is poured off. Periodically, after a certain number of batches of slag have been treated, a predetermined volume of the enriched matte is removed and the vessel replenished with fresh matte having relatively low contents of the metal values. In the preferred form, for convenience of operation, the process is conducted in a tiltable furnace having a mouth opening through which slag and matte can be charged, and a spout opening in the side of the furnace below the mouth opening through which matte and slag can be selectively discharged by tilting the furace to the appropriate angle. A convenient treatment vessel is, for example, a modified form of a conventional Pierce Smith converter.

It will be appreciated, however that the operations of dissolving reductant in the matte if necessary, agitating the matte and slag together, settling, and separating the impoverished slag and the enriched matte are well adapted to be carried out continuously, for example with co-current or counter-current continuous matte and slag flows.

Embodiments of the present recovery process will now be more fully described by way of example only with reference to the accompanying drawings, in which.

Figure 1:
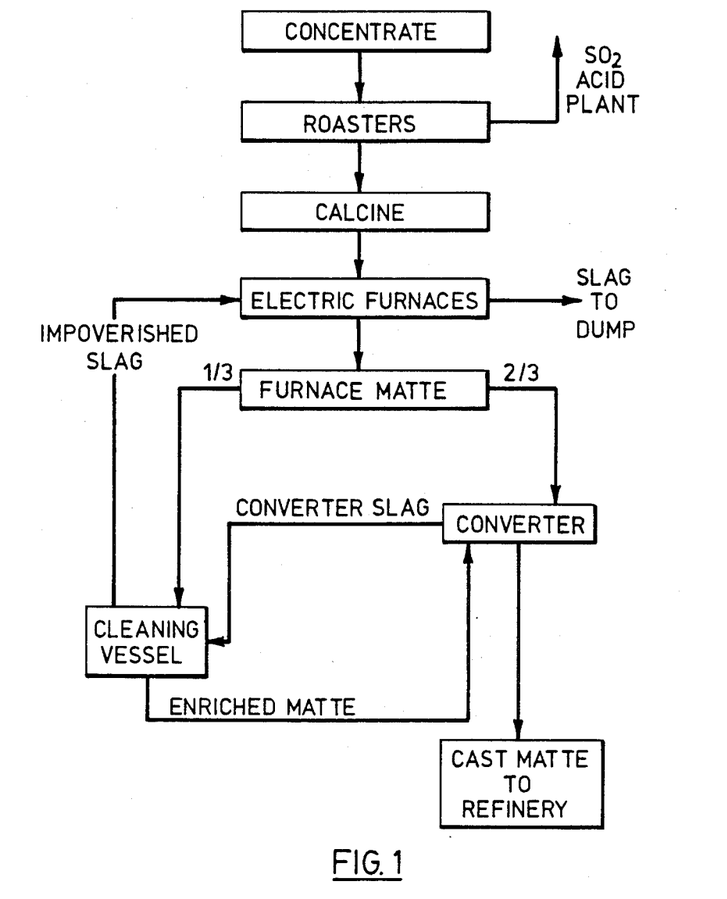
FIG. 1 is a flow sheet illustrating schematically the application of the present recovery process to a smelting process.

Referring to FIG. 1, this illustrates the slag cleaning or metal recovery process of the present invention in a conventional process for recovering metal from an ore. As is indicated in FIG. 1, customarily a concentrate such as a sulfidic nonferrous metal concentrate is roasted to eliminate part of the sulfur content, and the sulfur dioxide thus produced is recovered, for example in a sulfuric acid manufacturing plant. The roasted concentrate, or calcine, is then passed to an electric furnace, such as an electric arc furnace, where it is smelted in the presence of fluxing agents and coke or other carbon-bearing reductants, to yield a high iron matte and a slag which contains very little value metals and is hence usually discarded. The matte from the electric furnace is subsequently treated in a converter with further fluxing agents, oxidants and other additives, according to the nature and composition of the roasted concentrate, to produce a sulfur, iron and oxygen-bearing matte containing most of the non-ferrous value metals, and a converter slag which, owing to its having been generated in contact with a matte relatively rich in value metals, tends to contain value metals. For example, in the case of a nickel smelting process, the converter slag may contain nickel, cobalt and copper which are dissolved or otherwise occluded in the slag during the converting operation. In the present invention, the valuable non-ferrous metals are recovered from the converter slag in a cleaning vessel to which is also supplied, in the example illustrated, matte from the electric furnaces. As shown, typically about one-third of the matte produced in the electric furnaces may be supplied to the cleaning vessel, whereas the remaining two-thirds may be supplied direct to the converters.

In the cleaning vessel, the converter slag and matte are gently agitated together. The mixture is then allowed to settle into an upper layer constituted by a slag relatively impoverished in metal values, which is returned to the electric furnaces, and a matte relatively enriched in the metal values and which is fed to the converters and subsequently to refining.

Figure 2:
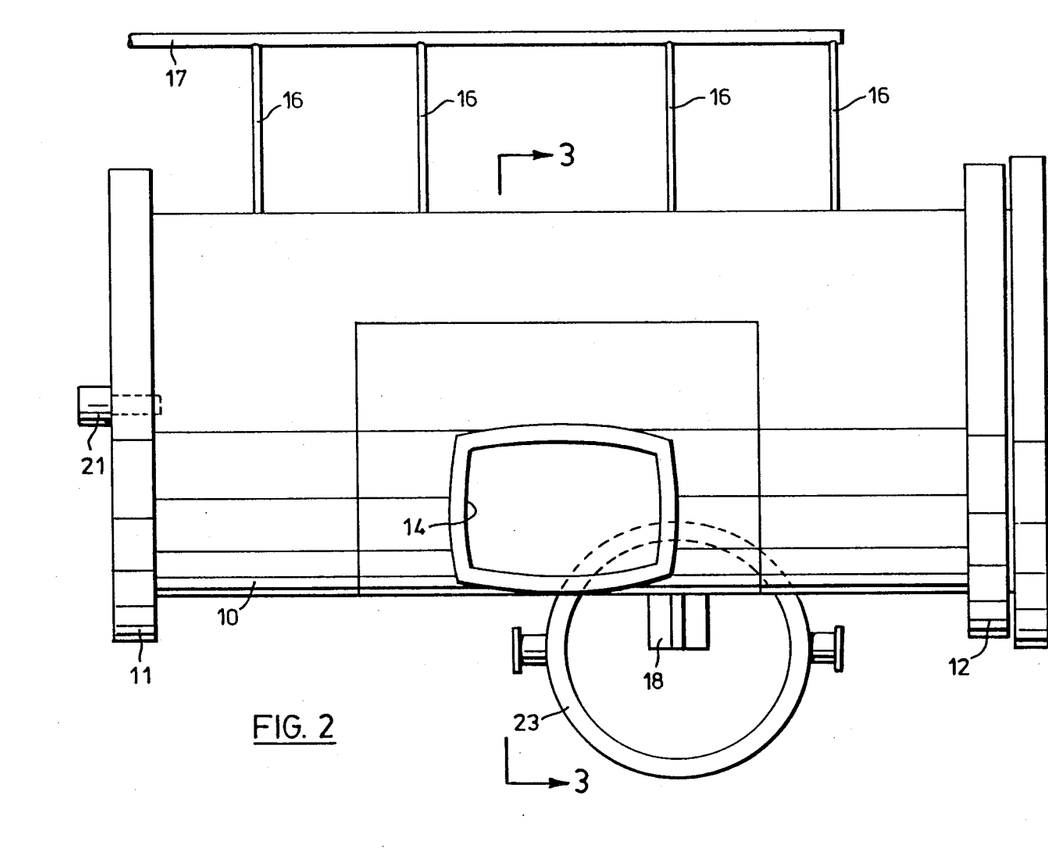
FIG. 2 shows somewhat schematically a plan view of a cleaning vessel for use in a batch form of the present process.
Figure 5:
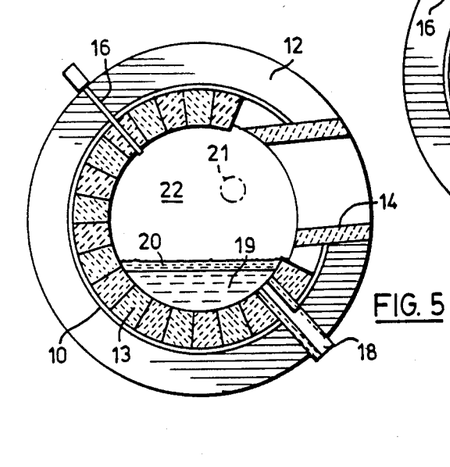
Figure 6:
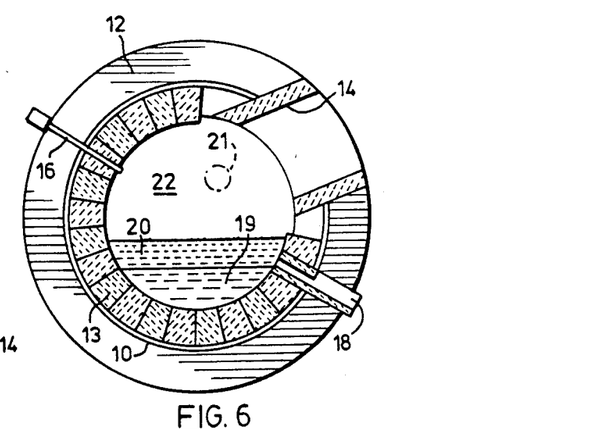

Referring to FIG. 2, this shows somewhat schematically a plan view of a preferred form of cleaning vessel for use in a batch form of the present process. The vessel comprises a modified Pierce Smith converter comprising a horizontally disposed cylindrical shell 10 having enlarged diameter rings 11 and 12 at each end where the vessel is mounted on rollers, whereby, on rotation of the rollers, the cylindrical vessel can be rotated about its axis. As seen in the cross sectional views of FIGS. 3 to 6, the shell 10 is lined with refractory lining 13. As compared with the conventional Pierce Smith converter, the present vessel is modified in that it has a mouth opening 14 of reduced size (preferably about 10 ft$^2$ in the case of a vessel of the conventional 30 ft length and 13 ft diameter dimensions) in order to reduce ingress of air and hence reduce oxidation, and in order to reduce heat losses from the interior of the vessel. Further, the vessel is provided with a small number of tuyeres, 16, fed from a common gas supply conduit 17. Typically, four or fewer tuyeres are required because of the relatively low stirring gas flow rates. Further, the vessel is provided with a tapping spout 18 in its side at a level below and conveniently adjacent the mouth 14 whereby upon rotation of the vessel to appropriate positions, as illustrated in FIGS. 5 and 6, respectively, the spout 18 may be employed to tap from the vessel selectively either matte 19 from the lower matte layer present in the vessel or slag 20 from the upper slag layer maintained in the vessel. At one end the vessel is provided with a gas flame burner, e.g. a natural gas burner 21, the position of which is indicated in broken lines in FIGS. 3 to 6, firing into the freeboard space 22 within the vessel above the slag layer.

FIG. 2 also shows a conventional metallurgical ladle 23 positioned below the spout 18 in order to receive matte or slag tapped from the vessel. The upper portion of the ladle 23 is also seen in FIG. 3.

A typical cycle of operations will be described, commencing at the point where the vessel is in the "safe" position shown in FIG. 4, having the tuyeres 16 and spout 18 above the molten charge, and contains about 40 to about 60 mT matte, and a small depth of slag, e.g. about 4 to 6 inches of slag, forming a protective layer over the upper surface of the matte. The temperature of the charge of slag and matte is maintained throughout the operations in the range about 1180° to about 1235° C. using the freeboard gas burner 21.

Figures 3, 4:
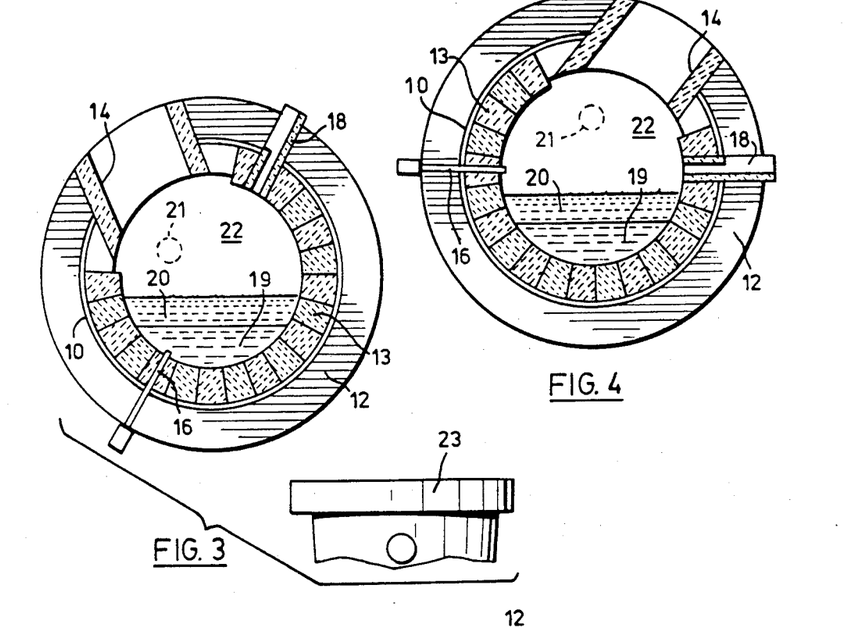
FIGS. 3 to 6 show vertical cross sections through the vessel of FIG. 2 in various operating attitudes.

Flow of nitrogen stirring gas at desired low flow rate is commenced through the tuyeres 16, and the vessel is rotated to the stirring position shown in FIG. 3 wherein the tuyeres 16 are immersed beneath the surface of the matte. Instead of charging the reductant after the slag has been added, preferably the ferrosilicon or other solid reductant is charged into the vessel before the slag is added, using pieces of ferrosilicon of particle size in the range between +200 Tyler mesh and 2", and in such manner that the ferrosilicon tends to be distributed somewhat along the axis of the vessel, and is not concentrated at one point in the vessel. The stirring of the vessel is then continued for a short period, e.g. about two minutes, in order to dissolve the ferrosilicon or other solid reductant in the matte. As mentioned earlier, often the solid reductant generates gas, and it is desired to distribute the reductant in the matte, to melt it, and to allow evolved gas to be liberated from the charge before slag is added to the vessel, in order to avoid or reduce problems of foaming of the charge within the vessel.

The vessel is rotated to the position shown in FIG. 4, and flow of stirring gases through the tuyeres 16 can be stopped at this point, although a small volume flow rate of air may be passed through the tuyere 16 for cooling purposes. Slag is poured into the vessel through the mouth opening 14. The vessel is rotated back to the stirring position shown in FIG. 3, and flow of stirring gas through the tuyeres is recommenced at a low rate in order to gently agitate the slag and matte together. Typically, during the agitation, the vessel contains a total weight of matte and slag of about 100 mT. The gentle intermingling of the slag with the matte containing the reductant causes oxidized metal values such as nickel, cobalt and copper values present in the slag to become collected in the matte, as a result of a washing action exerted by the matte on the slag, as a result of coalescence of particles of converter matte which may be entrained in the converter slag, and as a result of the reducing capabilities of the matte serving to reduce oxidized species present in the slag to reduced or elemental form, whereby they are washed out from the slag by the washing action of the matte referred to above. Preferably, the stirring is continued for a period of about 6 to about 15 minutes.

The vessel is then again rotated to the safe position illustrated in FIG. 4, and the flow of stirring gas is stopped. The charge of slag and matte is permitted to settle so that the slag and matte form distinct layers. Typically, the settling will be completed with substantially no content of inclusions of one phase in the other after a period of about two minutes. The vessel can then be tilted to the position shown in FIG. 6 to allow the impoverished slag to flow from the vessel through the spout 18 into a ladle such as the ladle 23, in which it can be transferred to the electric furnaces, and leaving sufficient slag in the vessel to form a covering protecting the matte from oxidation through contact with oxygen in the freeboard space 22. The vessel can then be turned to the position shown in FIG. 4 and above-described cycle of operations can be repeated.

As discussed above, in the preferred form for every 3 to 5 volumes of slag that are treated in the vessel one volume of enriched matte is withdrawn from the vessel, and is replaced by one volume of electric furnace matte relatively poor in metal values. Thus, after, for example, four volumes of slag have been treated in the vessel, the vessel can be rotated to the position shown in FIG. 5, so that the matte present in the vessel flows uut through the spout 18 into a ladle or the like. After a desired volume has been removed, the vessel can be rotated to the safe position of FIG. 4, and one volume of fresh furnace matte can be charged into the vessel through the mouth opening 14. The above-described cycle of operations can then be resumed.

Some detailed Examples of recovery processes in accordance with the invention will now be given.

EXAMPLES 1 to 7

Nickel smelting operations employing processes of value metal recovery from the converter slag were conducted in an industrial scale vessel as described above with reference to FIGS. 1 to 6 of the accompanying drawings.

In Examples 1 to 5, stirring of the charge of slag with the matte was conducted for 8 to 15 minutes, followed by a 5 minute settling period. In examples 6 and 7 the stirring was for from 6 to 15 minutes and settling for 2 minutes.

In each Example, a regime of maintaining certain volume ratios of slag to matte was observed i.e., on average, after the number of volumes of slag indicated in Table 3 below had been treated in the treatment vessel, 1 volume of enriched matte was removed from the treatment vessel and 1 volume of fresh furnace matte was introduced into the cleaning vessel.

The ferrosilicon employed was 9 to 18% silicon by weight and in Examples 1 to 5 was added to the slag present in the vessel after the slag had been added. In Example 6 the ferrosilicon was added to the matte i.e. before the batch of slag to be treated was added to the vessel. In each Example, except Example 7, the ferrosilicon additions, stirring conditions and slag to matte volume ratios indicated in Table 3 below were employed for a period of one full day. In Example 7, operations were conducted over a period of 8 hours without addition of ferrosilicon or other reductant to the cleaning vessel. In each Example, the converter slags, the impoverished cleaned slags, the electric furnace mattes fed to the cleaning vessel, and the enriched mattes withdrawn from the vessel were analyzed and the analyses indicated below in Tables 1 and 2 are averages for the day in the case of Examples 1 to 6 and for the eight hour period in case of Example 7.

The efficiency of the slag cleaning process is indicated in Table 3 by the distribution constant K metal, which is defined as the ratio of weight percent of the metal in the enriched matte to the weight percent of the metal in the impoverished slag. Although the actual recoveries of value metals are affected by factors in addition to the K values, the K values and especially the KCo are considered to be performance indicators, indicating the efficiency that is obtainable with the slag cleaning process.

TABLE 1

| | Slag compositions | | | | | |
|---|---|---|---|---|---|---|
| | Slag charged | | | Cleaned slag | | |
| Example No. | Ni % | Co % | S % | Ni % | Co % | S % |
| 1 | 0.97 | 0.520 | 1.83 | 0.210 | 0.192 | 2.70 |
| 2 | 1.17 | 0.557 | 1.58 | 0.240 | 0.173 | 2.56 |
| 3 | 1.81 | 0.474 | 1.65 | 0.208 | 0.212 | 2.46 |
| 4 | N/A | 0.61 | N/A | 0.170 | 0.20 | 2.38 |
| 5 | N/A | 0.52 | N/A | 0.140 | 0.16 | 2.81 |
| 6 | 0.92 | 0.49 | 1.74 | 0.19 | 0.17 | N/A |
| 7 | N/A | 0.49 | N/A | 0.27 | 0.25 | N/A |

TABLE 2

| | Matte compositions | | | | | | | | | |
|---|---|---|---|---|---|---|---|---|---|---|
| | Electric furnace matte supplied to cleaning vessel | | | | | Final composition of matte withdrawn from vessel | | | | |
| | Ni % | Cu % | Co % | Fe % | S % | Ni % | Cu % | Co % | Fe % | S % |
| Example 1 | 15.35 | 14.5 | 0.78 | 39.8 | 26.1 | 15.64 | 16.30 | 1.56 | 38.6 | 25.5 |
| Example 2 | 16.65 | 15.2 | 0.70 | 38.6 | 26.5 | 17.54 | 17.60 | 1.88 | 36.1 | 24.4 |
| Example 3 | 14.15 | 15.0 | 0.69 | 40.3 | 24.5 | 15.99 | 17.82 | 1.66 | 36.6 | 24.6 |
| Example 4 | 17.0 | 13.7 | 0.94 | 39.8 | 25.3 | 20.13 | 15.13 | 2.48 | 37.5 | 21.3 |
| Example 5 | 15.6 | 17.6 | 0.62 | 38.9 | N/A | 17.80 | 19.00 | 1.88 | 37.3 | 20.8 |
| Example 6 | 16.0 | 15.2 | 0.57 | 40.1 | 25.8 | 18.4 | 16.6 | 1.55 | 36.7 | 22.3 |
| Example 7 | 13.8 | 13.2 | 0.57 | 44.1 | 26.7 | 18.9 | 16.2 | 1.82 | 36.2 | 25.3 |

TABLE 3

| | Operating conditions and results | | | | | | |
|---|---|---|---|---|---|---|---|
| Example No. | Ratio slag to matte | Ferrosilicon | | Stirring gas | | K Metal | |
| | | % on slag | Fed to | Type gas | Flow $Nm^3/hr$ | $K_{Ni}$ | $K_{Co}$ |
| 1 | 3.8 | 4.0 | slag | $N_2$ | 680 | 74.0 | 8.1 |
| 2 | 4.6 | 4.5 | slag | $N_2$ | 680 | 73.0 | 10.9 |
| 3 | 4.3 | 4.0 | slag | Air | 680 | 77.0 | 7.8 |
| 4 | 5.7 | 4.5 | slag | $N_2$ | 680 | 118.0 | 12.4 |
| 5 | 4.3 | 4.5 | slag | $N_2$ | 240 | 127.0 | 11.8 |
| 6 | 3.5 | 4.4 | matte | $N_2$ | 65 | 96.8 | 9.1 |
| 7 | 3.6 | nil | — | $N_2$ | 32 | 70.0 | 7.3 |

EXAMPLES 8 to 1

Effect of Various Stirring Conditions on Value Metal Recovery Efficiency

Table 4 summarizes the results in terms of $K_{Co}$ achieved by conducting the process described above with reference to FIGS. 1 to 6 under varying degrees of intensity of agitation. In each of Examples 8 to 14, the stirring gas was nitrogen and the ferrosilicon reductant was added in an amount of 4–5% based on the weight of the slag. In each case, except in Example 14, the $K_{Co}$ result represents the aggregate value of $K_{Co}$ achieved from numerous slag cleaning operations conducted on an industrial scale, successively during a prolonged continuous period of at least one day and, in some cases, for up to 6 days. Example 14, wherein high intensity agitation was employed, represents a single slag cleaning operation wherein the charge of slag and matte was agitated for a period of 8 minutes and the $K_{Co}$ measured from samples of slag and matte obtained after allowing settling for 2 minutes.

Table 4 shows the stirring energy dissipation rates, calculated in terms of energy dissipation rate per agitating means, i.e. watts per tuyere per mT, stirring gas flow per tuyere ($Nm^3/hr$ per tuyere). Table 4 also shows the total weight of matte plus slag present in the vesse in each slag cleaning operation, and the stirring energy dissipation rate calculated in terms of the total agitation energy applied per 100 mT of agitated matte and slag (watts per 100 mT). It will be seen that with increasing agitation energy dissipation rates, there is an increase in $K_{Co}$, indicating increased efficiency of value metal recovery from the slag. Beyond a certain point, however, the $K_{Co}$ value begins to drop off. It is considered that this is because at high stirring energy dissipation rates, large quantities of the molten matte are brought into contact with the oxidizing atmosphere present in the freeboard space resulting in the oxidation of the iron present in the matte and thus impairing the reduction potential of the matte.

TABLE 4

| Example No. | Number of tuyeres | Stirring gas flow rate ($Nm^3/hr$) | | Weight of slag plus matte treated (mT) | Agitation energy dissipation (watts) | | | $K_{Co}$ |
|---|---|---|---|---|---|---|---|---|
| | | Total | Per Tuyere | | Total | Per agitation means (tuyere per mT) | Per mT slag plus matte | |
| 8 | 0 | 0 | 0 | 100 | 0 | 0 | 0 | 7.5 |
| 9 | 1 | 25 | 25 | 100 | 60 | 60 | 60 | 11.0 |
| 10 | 1 | 35 | 35 | 100 | 88 | 88 | 88 | 13.5 |
| 11 | 2 | 120 | 60 | 100 | 300 | 150 | 300 | 13.7 |
| 12 | 4 | 240 | 60 | 100 | 610 | 150 | 610 | 11.8 |
| 13 | 4 | 680 | 170 | 100 | 1720 | 430 | 1720 | 9.8 |
| 14 | 4 | 970 | 242.5 | 112 | 2460 | 615 | 2200 | 6.3 |

Under the particular reaction conditions under which the processes of Examples 8 to 14 were conducted, it was considered that with agitation energy dissipation rates outside the preferred ranges indicated in Table 5 below, there would be considerable impairment of the efficiency of the recovery process:

TABLE 5

| Stirring Energy Dissipation Rate | Preferred range |
|---|---|
| Per agitating means (e.g. per tuyere) | 5 to 600 watts per mT |
| Stirring gas flow per | 3 to 250 $Nm^3/hr$ |

TABLE 5-continued

| Stirring Energy Dissipation Rate | Preferred range |
|---|---|
| injection orifice (tuyere) Per mT of total weight of slag plus matte | 20 to 2000 watts |

Such preferred stirring energy dissipation rates are insufficient to create a slag-matte emulsion.

EXAMPLES 15 to 17

Small scale trials employing various solid reductants were carried out. In each case, 1 kg of converter slag together with 300 gm of furnace matte was maintained at a temperature of 1250° C. in an externally heated crucible. The compositions of mattes and slags charged were identical in each case. The melt was stirred with nitrogen introduced through an iron pipe lance positioned in the slag above the matte phase, and the solid reductant ws added. After an equal stirring time in each case, a sample of the slag was removed and analyzed for its nickel and cobalt content.

The reductants used, their silicon contents, the quantity of reductant used and the nickel and cobalt contents of the final slag samples are indicated in Table 6.

TABLE 6

| | Solid Reductant | Silicon Content (Weight %) | Quantity (Weight % on slag) | Slag composition (weight %) | |
|---|---|---|---|---|---|
| | | | | Ni | Co |
| Example 15 | Fe powder | — | 3.75 | 0.09 | 0.14 |
| Example 16 | FeSi | 15% | 2.5 | 0.10 to 0.14 | 0.07 to 0.10 |
| Example 17 | FeSi | 50% | 1.5 | 0.09 | 0.09 |

The results show that satisfactory slag cleaning can be effected using various solid reductants.

Effect of Iron Concentration on Recovery

Figure 7:
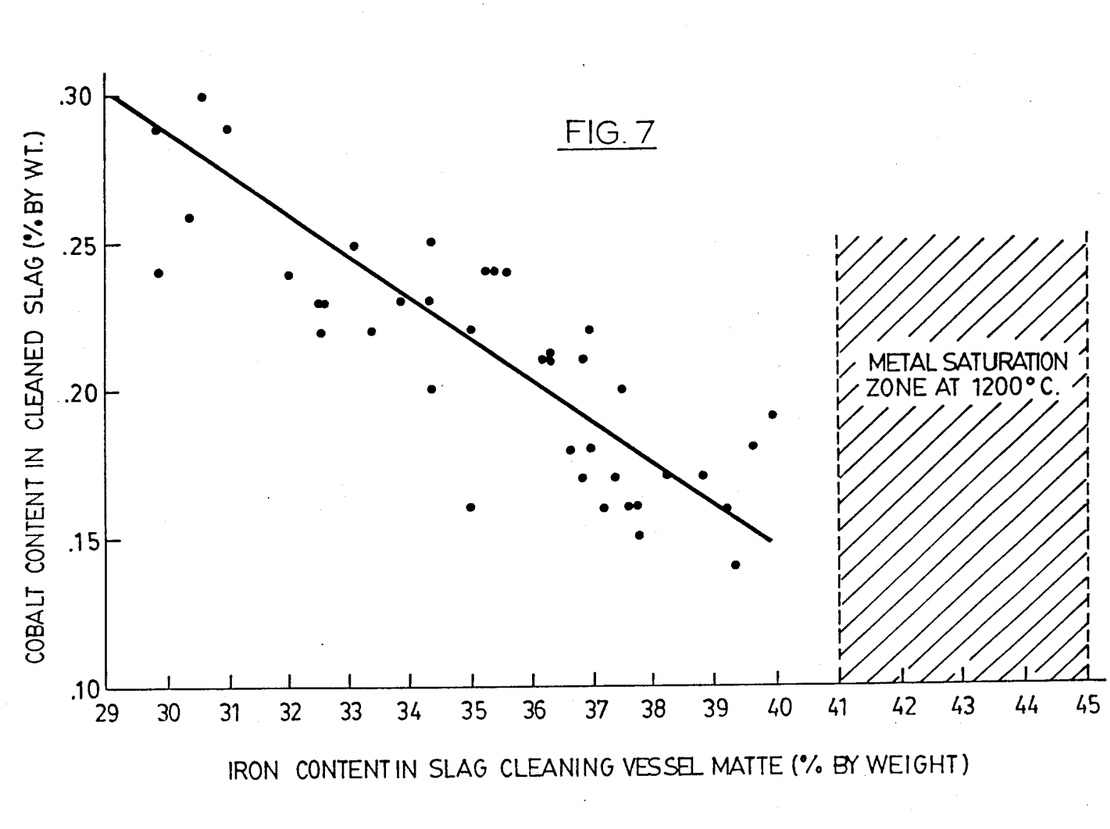
FIG. 7 is a graph of iron content in the matte employed in the process, against cobalt content in the cleaned slag.

FIG. 7 graphs iron concentration in the slag cleaning vessel matte against cobalt concentration in the cleaned slag. The values plotted in the graph were obtained by analyses of the mattes and slags achieved in numerous successive slag cleaning operations as described above with reference to FIGS. 1 to 6, conducted on an industrial scale. The iron concentration of the matte is the total iron analysis of the matte, and thus represents all forms of iron present in the matte. As will be seen from the graph, it was found that the greater the iron content, the smaller the content of cobalt in the slag and hence the greater the effciency of the recovery of the value metal cobalt. Also indicated on the graph is the metal saturation zone at which solid iron-based alloy is in practice found to precipitate out at 1200° C. from the mattes employed in these operations.

We claim:

1. Process for recovering non-ferrous metal from metallurgical slag comprising providing a metallurgical slag containing an elevated concentration of a non-ferrous metal, contacting the slag in molten state with a molten matte having a content of the non-ferrous metal sufficiently low that the matte can absorb the non-ferrous metal from the slag, gently agitating the matte to intermingle the slag with the matte without forming a slag-matte emulsion by injecting stirring gas into the matte through one or more injection orifices, the flow rate of gas through the or each injection orifices being in the range of from about 3 to about 250 Nm³/hr, continuing the agitation of the matte for a period sufficient to cause enrichment of the matte with the non-ferrous metal by transfer from the slag and to thereby impoverish the slag in the non-ferrous metal, allowing the matte and slag to settle into distinct layers, removing the impoverished slag and recovering a matte relatively enriched in the non-ferrous metal and wherein said injection of stirring gas dissipates energy within said intermingled slag and matte, the rate of such energy dissipation being from about 40 to about 2000 watts per mT (metric Tonne) of the total weight of the agitated quantity of slag and matte, throughout said period of agitation.

2. Process according to claim 1 wherein said energy dissipation rate is from 40 to about 1600 watts per mT (metric Tonne).

3. Process according to claim 1 wherein said energy dissipation rate is from about 40 to about 650 watts per mT (metric Tonne).

4. Process according to claim 1 wherein said flow rate is about 8 to about 160 Nm³/hr.

5. Process according to claim 4 wherein said flow rate is about 15 to about 65 Nm³/hr.

6. Process according to claim 1 wherein the injected gas is selected from the group consisting of mildly oxidizing gases, neutral gases and reducing gases, and mixtures thereof.

7. Process according to claim 6 wherein the gas is selected from the group consisting of carbon dioxide, nitrogen, argon, ammonia, hydrogen, natural gas and mixtures thereof.

8. Process according to claim 7 wherein the gas is nitrogen.

9. Process according to claim 1 wherein a discrete quantity of the slag and matte is isolated in a containment vessel before the matte is agitated.

10. Process according to claim 1 wherein said slag includes said non-ferrous metal in the form of a metal oxide, and including the step of adding to one of said matte and slag a solid reductant capable of reducing said metal oxide to reduced form.

11. Process according to claim 10 wherein said slag includes $Fe_3O_4$ and said reductant is used in an amount slightly in excess of that required to reduce substantially all the $Fe_3O_4$ present in the slag to FeO and said metal oxide present in slag to elemental value metal.

12. Process according to claim 11 wherein said reductant is used in an amount slightly in excess of that required to reduce at least part of the FeO to Fe.

13. Process according to claim 10 wherein the solid reductant is selected from the group consisting of iron, silicon carbide, aluminum, calcium, calcium silicide and ferrosilicon.

14. Process according to claim 10 wherein at all times before recovery of the enriched matte, said matte is overlain by a protective layer of slag.

15. Process according to claim 14 wherein the solid reductant has a specific gravity greater than that of said slag.

16. Process according to claim 15 wherein the solid reductant is ferrosilicon containing about 9 to about 18 weight percent silicon.

17. Process according to claim 10 wherein the solid reductant is added to the matte and any gas formed is allowed to evolve before agitating the matte with the slag.

18. Process according to claim 1 wherein the matte and slag are maintained at a temperature of about 1150° to about 1250° C.

19. Process according to claim 18 wherein the temperature is about 1180° to about 1235° C.

20. Process according to claim 1 conducted in association with a value metal extraction process wherein an impure form of the value metal is smelted in a furnace in the presence of flux to obtain a slag and a furnace matte, the slag is discarded and the furnace matte divided into first and second portions of which said first portion is reacted with oxygen and flux in a metallurgical converter to obtain a high grade converter matte which is recovered and a converter slag containing quantities of value metal, and wherein said second portion of said furnace matte is employed as the matte in said recovery process and said converter slag is employed as said metallurgical slag in said recovery process, said impoverished slag is recycled to said furnace, and said enriched matte is recycled to said metallurgical converter.

21. Process according to claim 20 wherein said furnace matte is at a temperature of about 1100° to about 1200° C. and said converter slag is at a temperature of about 1200° to 1300° C.

22. Process according to claim 21 wherein said furnace matte is at a temperature of about 1120° to about 1150° C.

23. Process according to claim 1 wherein the matte is agitated for a period of from about 5 to about 20 minutes and the slag and matte are allowed to settle for a period of about 1 to 5 minutes.

24. Process according to claim 23 wherein said agitation period is about 5 to about 15 minutes and said settling period is about 1 to 3 minutes.

25. Process according to claim 1 wherein the slag and matte are maintained at elevated temperature by a gas flame burner firing into a freeboard space above them.

26. Process according to claim 1 wherein a plurality of volumes of the slag are agitated together with each volume of matte before the enriched matte is recovered.

27. Process according to claim 26 wherein the slag to matte volume ratio is about 2:1 to about 10:1.

28. Process according to claim 27 wherein said volume ratio is about 3:1 to about 5:1.

29. Process according to claim 1 wherein the non-ferrous metal is selected from the group consisting of copper, cobalt, nickel and mixtures thereof.

30. Process according to claim 29 wherein the matte comprises sulfur, iron and a metal selected from the group consisting of nickel, copper, cobalt and mixtures thereof.

31. Process according to claim 29 wherein said non-ferrous metal is cobalt, and said matte comprises a sulfidic nickel iron matte.

32. Process according to claim 1 conducted in a tiltable furnace having a mouth opening through which slag and matte can be charged and a spout opening in the side of the furnace below the mouth through which matte and slag can be selectively discharged by tilting the furnace, and including the steps of tilting the furnace to a first position in which the spout opening is applied to the slag and discharging slag from the furnace, and subsequently tilting the furnace to a second position in which the spout opening is applied to the matte and discharging matte from the furnace.

* * * * *